Aug. 2, 1938.  W. H. SCHACHT  2,125,740
HYDRAULIC EXCAVATING DEVICE OR BOOSTER
Filed Dec. 24, 1934  3 Sheets-Sheet 1

Inventor
William H. Schacht
by Parker &c.
Attorneys.

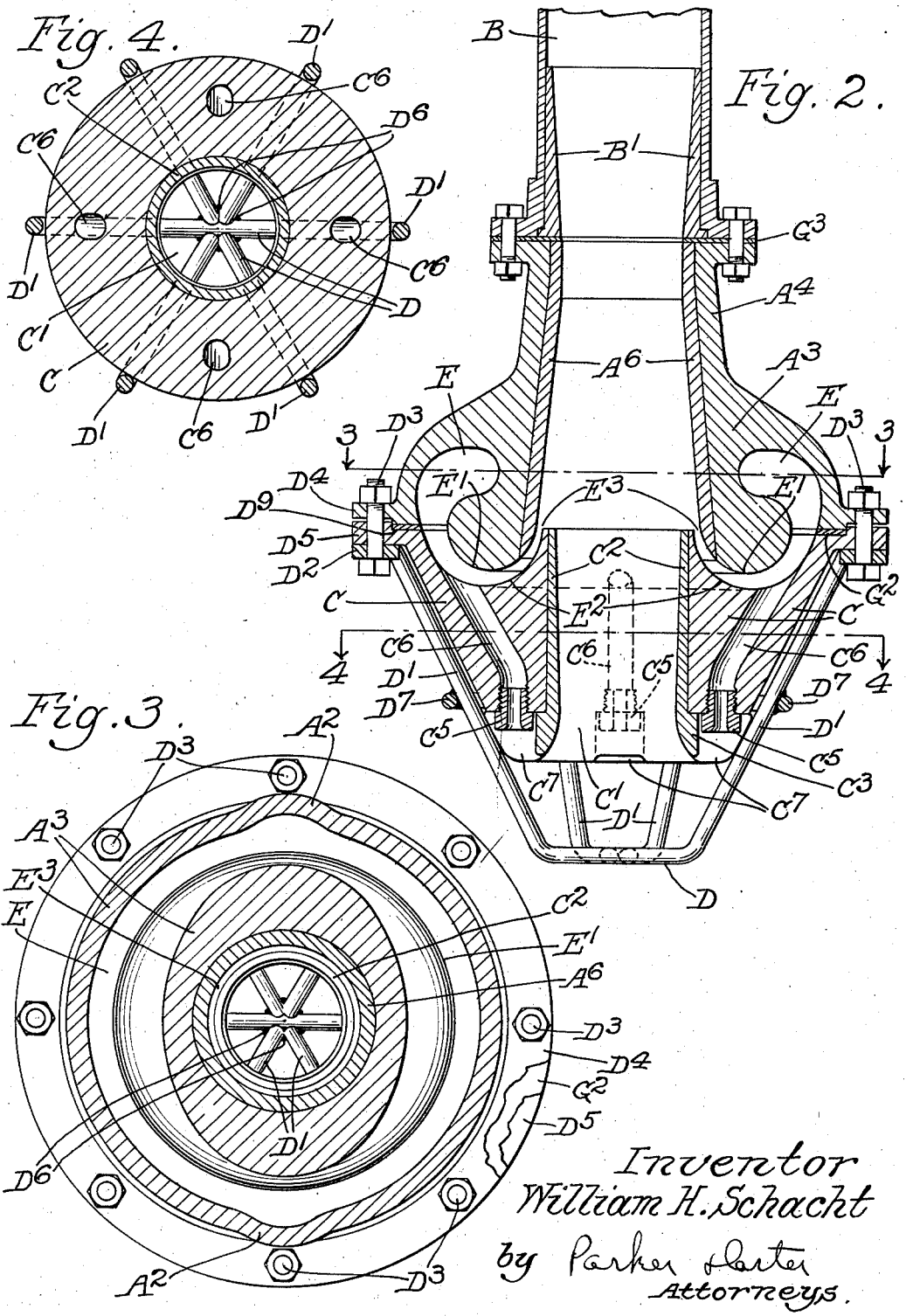

Patented Aug. 2, 1938

2,125,740

UNITED STATES PATENT OFFICE 2,125,740

HYDRAULIC EXCAVATING DEVICE OR BOOSTER

William H. Schacht, Painesdale, Mich.

Application December 24, 1934, Serial No. 758,923

7 Claims. (Cl. 37—62)

My invention relates to a hydraulic excavating device and method adapted for excavating submerged sand, gravel, mine tailings or other materials. My device may be employed, for example, by being attached to the submerged end of the upcast pipe of hydraulic dredges, well or shaft sinking excavators and the like. I may use a primary stream of water or fluid under high pressure, discharging through a nozzle, at high velocity, upwardly into the lower end of the upcast pipe in such manner as to greatly increase the area of the high velocity portion (directly beyond orifice) of the primary stream, and induce a high velocity of flow of pond or secondary water and solids into the intake tube and into the rising column of water discharged from the nozzle. Thereby, the submerged sand, gravel, tailings or the like are lifted from their original level at the bottom of the body of water and may be discharged above the surface of the water. Another application of my invention is as a booster for increasing the velocity of the fluid carrying medium of discharge lines handling sand or gravel or other liquid conveyed solids.

A primary object of my invention is materially to increase the percentage of solids to the liquid carried into the intake of the upcast pipe by the secondary stream of water or fluid entering the open or inlet end of the submerged pipe and thus increasing the ratio of solids to the nozzle water used as compared with present practice, thereby materially reducing the cost of the excavating operation.

I provide an improved intake device for use on hydraulic dredges and excavators of various types, to produce higher velocities of the pond or secondary water initially moving the sand or solids into the intake of the upcast or discharge pipe. As the carrying power of moving water or fluid varies as the sixth power of its velocity it follows that any slight increase in velocity of the pond or secondary water into the intake will greatly increase the ratio of solids to the fluid material moved.

I illustrate my invention more or less diagrammatically in the accompanying drawings, wherein—

Figure 2 is a section on the line 2—2 of Figure 1;

Figure 3 is a section on the line 3—3 of Figure 2;

Figure 4 is a section on the line 4—4 of Figure 2;

Like parts are indicated by like symbols throughout the specification and drawings.

Figure 1:
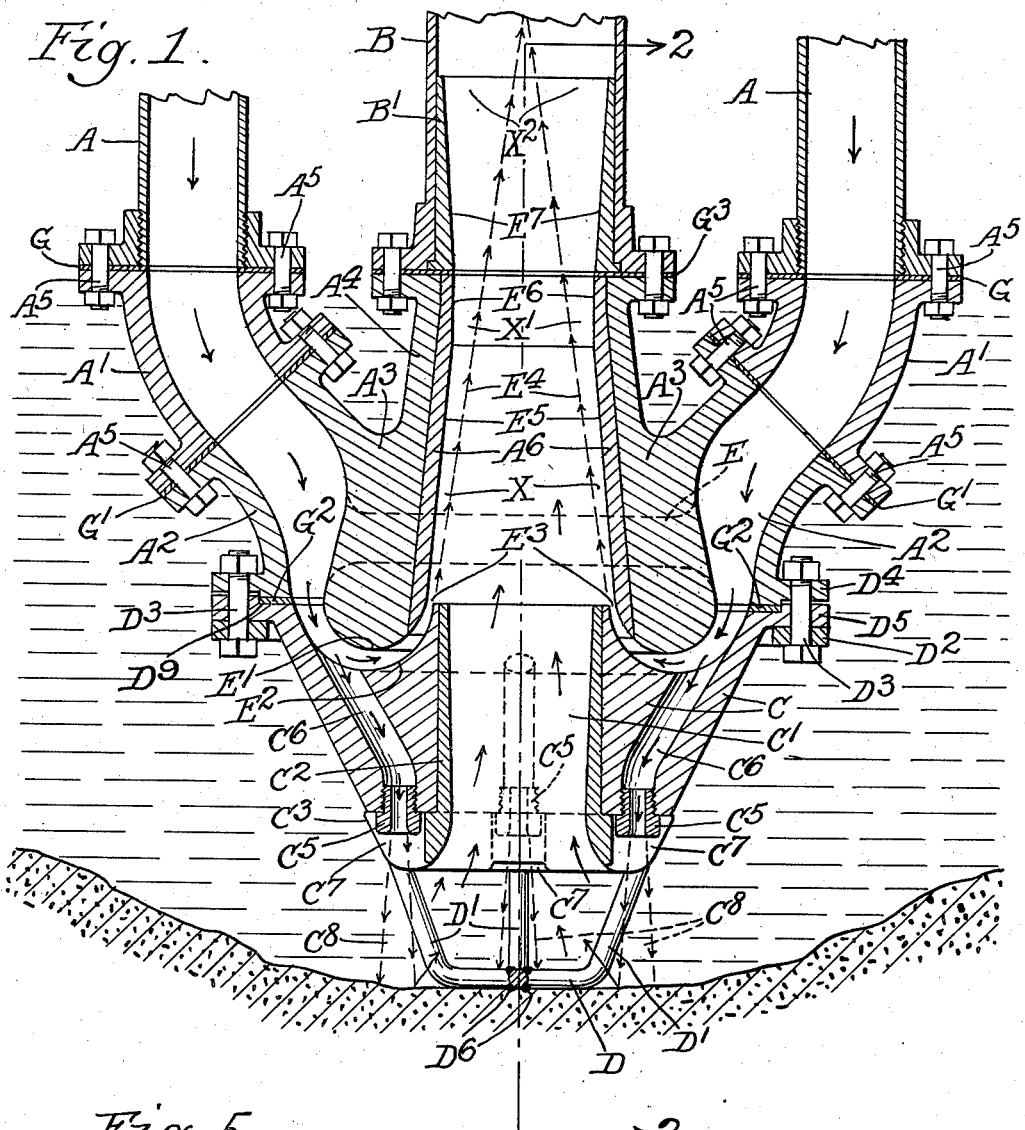
Figure 1 is a vertical axial section of the intake device, showing the primary water supply connections which lead to the pumps at the surface.
Figure 5:
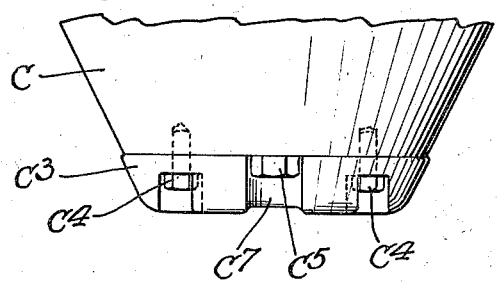
Figure 5 is a detail side elevation of the lower end of the intake with parts omitted.

Referring to the drawings, A generally indicates high pressure or primary water supply pipes extending from any suitable pump or pressure source not herein shown, the details of which do not form part of the present invention. Each of the pressure pipes A has associated with it a pipe segment $A^1$ in communication with a pressure inlet member $A^2$ of the intake generally indicated as $A^3$. The intake includes also a discharge throat $A^4$. The pipes $A^1$ may be secured to the pipes A and to the inlet members $A^2$ in any suitable manner as by means of bolts $A^5$. The discharge throat $A^4$ is shown as upwardly tapered and as provided with a liner $A^6$. Secured to the upper end of the discharge throat is the discharge pipe B provided with a tapered liner $B^1$. As will be clear, for example, from Figure 1, the liners $A^6$ and $B^1$ taken together are adapted to form a slightly constricting and then converging passage. Secured to the bottom of the throat $A^4$ is the intake member proper generally indicated as C and including a central throat $C^1$ provided with a liner $C^2$ having a bottom flange $C^3$ secured to the member C as by the bolts $C^4$. The throat $C^1$ is slightly conical, having a slightly larger diameter at the upper end of the sleeve $C^2$ so that the secondary stream with its solids will have a free entrance with no danger of clogging the throat $C^1$. In recesses in the member C are the hollow screws $C^5$ which serve as outlets for passages $C^6$ in communication with the pressure members $A^2$. The screws $C^5$ serve as jet nozzles whereby a jet of water under pressure is directed downwardly, as will be shown, for example, in Figures 1 and 2. The flange $C^3$ is cut away as at $C^7$ to form the recesses in alignment with the jet nozzles. The member C may or may not be surrounded by a cage generally indicated as D which includes a plurality of upwardly and outwardly inclined rods $D^1$ secured at their upper ends to a ring $D^2$, as by welding. The ring $D^2$ is locked in position as by bolts $D^3$, which bolts pass through flanges $D^4$ and $D^5$ on the members $A^3$ and C respectively, whereby the entire structure is held firmly together. The rods $D^1$ extend downwardly along the exterior of the member C and conform quite closely to it and positively engage the bottom flange $C^3$ of the liner $C^2$. The rods $D^1$ may be welded together at the bottom as at $D^6$ and may be provided also with a circumferential reinforcing ring $D^7$.

The member $A^3$ is provided with a circumferential distribution passage E in communication with the pressure pipes A through the members $A^1$ and $A^2$. The opposed faces of the members $A^3$ and C are formed in arcuate walls respectively indicated as $E^1$ and $E^2$, defining a circumferential passage machined arcuately in cross-section, as shown for example in Figures 1 and 2. These faces are kept properly centered by counterbore $D^9$ in flanges $D^4$ and $D^5$. This passage decreases progressively in diameter and in width, ending in a discharge opening indicated as $E^3$, adapted to discharge water at high velocity upwardly along the face of the liner $A^6$. The inner surface and general direction of this discharge is indicated as by the dotted lines $E^4$ of Figure 1. The result of the employment of this nozzle is to turn the flow of water under pressure in the neighborhood of 180 degrees, causing it to flow in counterdirection and with increasing velocity. This water, at high velocity, is discharged through the annular orifice or nozzle $E^3$ upwardly in a ring-like converging stream the inner surface of which is defined generally by the dotted line $E^4$, with its axis parallel to the axis of the liner $A^6$. This long tapering hollow conical stream contacts on its outer surface, first a conical and constricting surface $E^5$ of the throat $A^6$, then a short cylindrical surface $E^6$ of the upper portion of the throat $A^6$ and finally a conical expanding surface $E^7$ of the liner $B^1$. These surfaces conform to the shape of the outside surface of the high velocity, ring-shaped, stream, after it leaves the discharge orifice $E^3$ and expands in section. The throat sleeve thus formed by the various surfaces above described is for the purpose of holding the stream of water in position against the influence of any outside forces that may tend to divert or deform it. For example, no deformation can be caused by the incoming secondary stream bearing upwardly through the liner $C^2$ and carrying solids with it. The liners $A^6$ and $B^1$ also take any wear that may be imparted by the solids as they pass into the stream and both liners may be removed. It will be understood that both liners may be removed for repair or renewal. Any suitable gaskets may be employed at all the joints in order to prevent leakage. The gaskets may, for example, be of rubber or any other suitable compressible material. I illustrate such gaskets as at G, $G^1$, $G^2$ and $G^3$. The orifice $E^3$ may be adjusted, for example, by varying the thickness of the gasket $G^2$, thus varying the section of the stream of water used.

This long tapering hollow conical stream or jet above described contacts on its inner surface the secondary fluid passing up through the liner $C^2$ and entrains and carries the contiguous particles of the fluids and solids of the secondary stream. I indicate as at X, between the dotted line $E^4$ and the surface $E^5$, the high velocity section of the primary stream after it leaves the ring orifice $E^3$, expanding in section as it advances. The portion $X^1$ is of lower velocity than X and the expanded portion $X^2$ is of still lower velocity and equal to that of the rising secondary column of liquid which it surrounds and entrains. The pressure head of the primary stream is converted into velocity head as it approaches orifice $E^3$. The primary stream immediately beyond the orifice is under little if any pressure head but increases again gradually as the stream passes through the area X and $X^1$ until it maintains a pressure head at $X^2$ sufficient, or more than sufficient to overcome the static head at that point plus the friction and velocity head of the ascending column of water and solids, plus the atmospheric pressure at the surface of the water. The high velocity section X of the primary stream produced by an annular ring orifice, such as $E^3$, is several times greater than that which can be produced by a round orifice nozzle making a solid jet. Both orifices using like amounts of water, the areas being to each other as to the averages of the diameters of the streams within the area. Thus with a ten inch discharge line, a ring orifice would be approximately ten inches in diameter, as compared to a solid stream orifice of one inch in diameter. These diameters being as 10 to 1 at the orifice end and approximately as 5 to 5 at the other end, or midway of the expanding stream, the average of the diameters is approximately as 7½ to 3. Therefore, the high velocity area of the hollow stream is at least 2½ times greater than the high velocity area produced by a solid stream. It is this larger surface of high velocity stream in the hollow jet produced by the ring orifice that offers greater contact and frictional stream surface and therefore greater entraining facilities to the secondary stream that is to be entrained and carried along with it than is possible with the solid jet. This relatively greater high velocity area of the primary stream makes it possible to move a greater quantity of secondary or pond water, and the greater the quantity moved through a fixed area, the higher the velocity attained by the secondary stream and the greater its carrying power. In order further to assist in providing this high velocity of the secondary stream, the length of the intake tube $C^2$ is reduced to a minimum, and a straight, direct passage, parallel to the axis of the converging jet delivered by the orifice $E^3$, and concentric with the axis of the intake tube $A^4$ is provided, all to reduce friction losses to a minimum. The solids move in a straight line and are cushioned from the throat liner $A^6$ by the annular stream X, $X^1$, thereby greatly reducing the wear of the liner. The secondary stream, with its solids, is completely surrounded by the high velocity annular converging stream X, $X^1$, which by its frictional contact, entrains and engulfs the secondary stream and carries it upwards to the surface through the passage B. There is no change of direction of the secondary stream, nor does it cross the path of the primary stream as is customary in other types of hydraulic jet excavators where the solids, in changing their direction of travel, cross the path of the jet and strike the throat liners, causing excessive wear. The present invention avoids the crowding of the solids against the throat liners $A^6$, $B^1$, which would result from using a central orifice jet. The crowding of the solids against the throat liner, which is thus avoided, would slow down the speed and reduce the velocity and carrying power of the secondary stream. Having thus imparted the highest possible velocity to the secondary stream the present invention also provides means for loosening and placing in suspension the solids to be excavated by means of high velocity jets delivered from the outlets or jet nozzles $C^5$ which are supplied from the primary stream through the inlets $A^2$ and are indicated by the dotted lines $C^8$ in Figure 1. These jets cut ahead of the intake, loosening and agitating the solids, placing them in suspension, and supplying a uniform feed of high density mixture directly to the intake entrance of the liner $C^2$. The lower portions of the rods $D^1$ serve to prevent any large stone blocking the lower end of the central throat $C^1$ and their use is optional.

Figure 6:
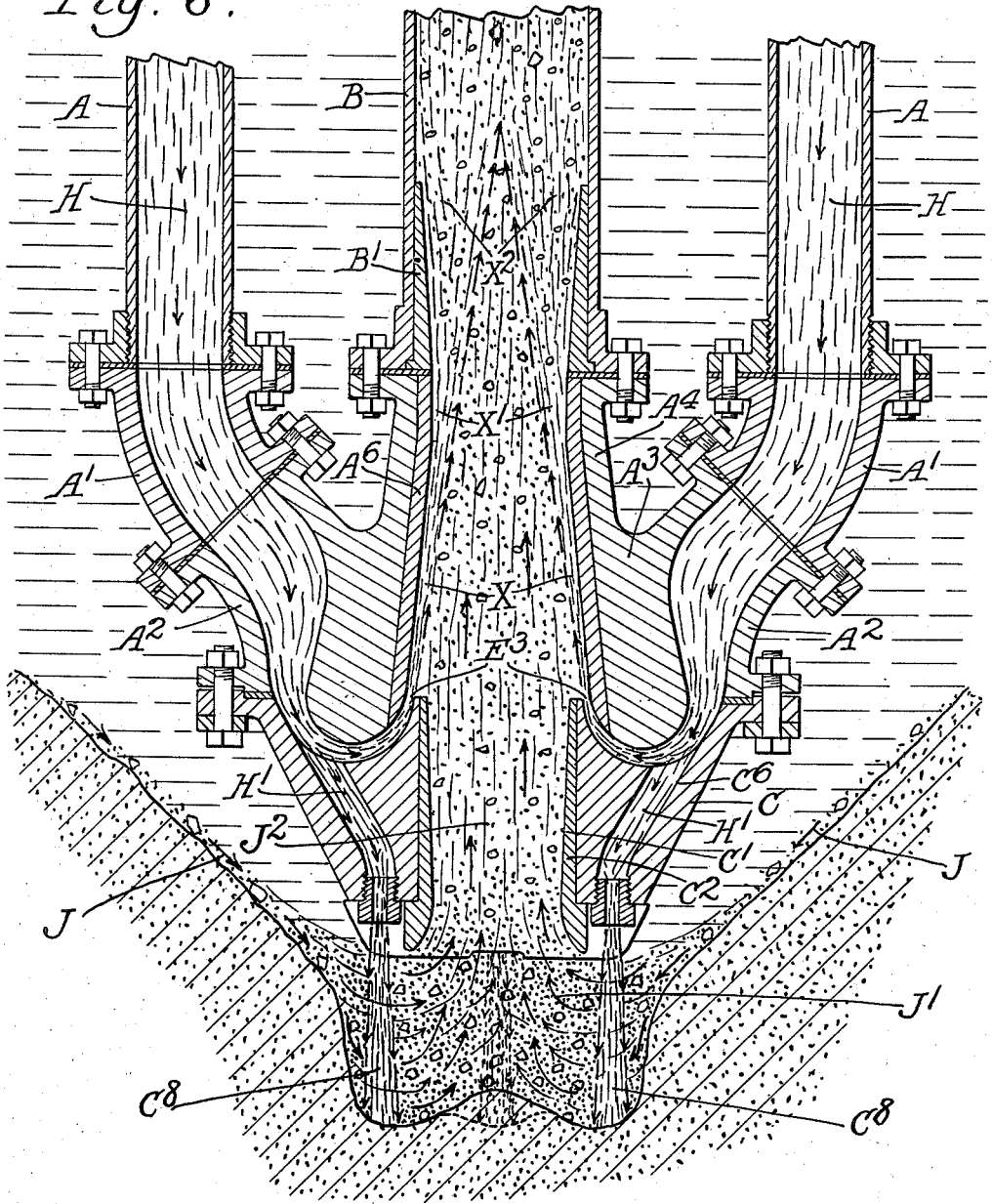
Figure 6 is a section similar to Figure 1, diagrammatically illustrating the movement of the water flow and of the particles carried by the water.

Referring, for example, to Figure 6, H indicates the primary flow or stream delivered under pressure along the passages A. Part of this primary stream as at $H^1$ passes through the ducts $C^6$ and the jet nozzle $C^5$ and is directed in the form of jets $C^8$ which cut into the bed of materials and form a conical depression down the slope of which may slide the material being excavated. When the individual particles near the intake aperture of the passages $C^1$, $C^2$, they are picked up by the secondary stream of pond water into the intake. Pond water moves down across the lower face of the conic depression as at J and then turns upwardly, with the carried particles as at $J^1$ and flows in a strong stream as at $J^2$, upwardly through the sleeve or liner $C^2$. Such particles as reach the pit of depression are placed in suspension by the jets $C^8$ and are subsequently carried into the intake.

Figure 6 shows what might be called ideal feeding conditions. It illustrates the action of the solids as they move into and up the intake passage as at $J^2$. The jets $C^8$ cut into the material to be excavated and place it in suspension at the entrance of the intake, to be drawn up by influence of the upwardly directed jet delivered through the aperture $E^3$. The action of the jet $C^8$, and this removal of the solids, forms a conical depression down which the material flows by gravity as at J, to a point close to the intake entrance of the passage $C^1$. Here it meets the secondary stream flowing into the intake, which entrains and engulfs and carries the particles along up the intake as at $J^2$. Any solids that reach the bottom of the pit are placed in suspension by the jets $C^8$ and are subsequently carried into the intake. Figure 6 shows what might be called an ideal feeding of the material to the intake the lower end of the intake reaching into the stream of solids at J as they flow by gravity down the conical slope. This gives a far more uniform feed of materials and of secondary water than would be possible if the intake member actually penetrated or re-sealed the bed of the solids. The sealing action, which is entirely prevented, for example, by the jets $C^8$ in relation to the position of the parts as shown in Figure 6, would interrupt the flow of secondary water and make the flow of material intermittent. For best results the intake should be kept, as shown in Figure 6, at a point or level where the density of the material in suspension is greatest, but without interrupting the flow of the secondary water and the entrained material. The high velocity attained by the secondary stream of the device gives it maximum carrying power. But the intake end of the device should be kept low enough or near enough to the surface being excavated to intercept or nearly intercept the flow of material down the slope. In other words, it should be immersed to the zone of highest density of mixture, but should not be sufficiently immersed to cut off the flow of the material coming down the slope. The inlet opening should at no time be sealed by solids and should not be positioned closely enough to the surface being excavated to be sealed by solids or stopped up. This is particularly important inasmuch as I depend on the high velocity of the secondary or carrying stream and this stream must therefore have an available ring or space of discharge or passage between the lower edge of the inlet opening and the opposed faces of the material being excavated.

It will be realized that whereas I have described and shown a practical and operative device, nevertheless many changes may be made in the size, shape, number and disposition of parts without departing from the spirit of my invention. I therefore wish my description and drawings to be taken as in a broad sense illustrative and diagrammatic rather than as limiting me to my specific showing. For example, my device or method may be employed in connection with moving solids in fluid suspension through a pipe other than a mere excavating pipe. For example, my invention may be applied as a booster for increasing the velocity of the fluid carrying medium in discharge lines carrying sand or gravel or other solids. Only a slight change is needed. For example, the nozzle $C^5$ and outlet $C^6$ may be dispensed with or plugged closed, and any suitable pipe connection may be employed in place of the flange $C^3$. So modified the device can be placed in a long distance discharge line used to move sand or gravel hydraulically. By boosting or increasing the velocity of the carrying fluid it will increase carrying efficiency and permit of greater distance of delivery.

It will be observed that the members D, $D^1$ may be used or dispensed with, depending on local conditions and the needs of operation.

I claim:

1. An intake device for hydraulic excavators, which includes an intake passage member comprising an upper passage portion and a lower passage portion having opposed abutting surfaces, and means for securing the upper and lower passage portions together, including an open wire cage adapted to surround and engage the lower passage portion and unitary means for securing said cage in relation to the upper passage portion and for securing said portions together.

2. An intake device for hydraulic excavators, which includes an intake passage member comprising an upper passage portion and a lower passage portion, and means for centering, aligning and securing the upper and lower passage portions together, including a cage adapted to surround and engage the lower passage portion and means for securing said cage in relation to the upper passage portion, said cage including a lower portion projecting downwardly below the bottom of the intake passage member and adapted to prevent a large piece of material from blocking the intake passage member.

3. In an intake device for hydraulic excavators, an inlet passage member provided with an aperture for the conveying of the particles excavated, means for maintaining a flow of an excavating liquid upwardly through said inlet passage member, means for directing excavating jets downwardly about the inlet mouth of said member, and spacing means adapted to space said inlet mouth upwardly from the surface being excavated while permitting ready access of the material being excavated, said spacing means extending substantially below the delivery level of said excavating jets.

4. In a hydraulic excavator, a liquid intake member, a liquid outlet member, a Venturi member therebetween, the liquid intake member and the venturi being separated by a generally continuous circumferential liquid inlet, a plurality of duct members surrounding and terminating at the general level of the lower end of the liquid inlet member, and adapted to direct jets of water downwardly thereabout, means for supplying water under pressure to said liquid inlet and to said duct members, and spacing means extending downwardly substantially below the discharge level of said duct members and the bottom of said liquid intake member.

5. In a hydraulic excavator, a liquid intake member, a liquid outlet member, a Venturi member therebetween, the liquid intake member and the venturi being separated by a generally continuous circumferential liquid inlet, a plurality of duct members surrounding and terminating at the general level of the lower end of the liquid inlet member, and adapted to direct jets of water downwardly thereabout, means for supplying water under pressure to said liquid inlet and to said duct members, and spacing means extending downwardly substantially below the discharge level of said duct members and the bottom of said liquid intake member, including a wire cage.

6. An intake device for hydraulic excavators which includes an intake passage member having a free lower intake edge and a free upper delivery edge, a discharge member axially alined with said intake passage member, and including a passage wall in the form of a venturi, a liquid supply passage generally parallel with said liquid outlet member, means for supplying a liquid downwardly therealong in a direction opposite to the direction of movement of the liquid through the discharge member, a circumferential liquid passage in communication therewith and surrounding the axis of the venturi and the intake passage member, and a delivery passage in communication with said circumferential passage, said delivery passage being formed with recurving walls, whereby a gradual reversal in direction of flow of the liquid is obtained, and terminating in a discharge lip adjacent and surrounding the upper lip of the intake passage member and generally alined with the lower face of the venturi, the length of the intake passage member being substantially less than the length of the venturi, and means for directing excavating jets downwardly about said intake passage member, including jet passages in communication with said liquid supply passage.

7. An intake device for hydraulic excavators which includes an intake passage member having a free lower intake edge and a free upper delivery edge, a discharge member axially alined with said intake passage member and including a passage wall in the form of a venturi, a liquid supply passage, means for supplying a liquid therealong, a circumferential liquid passage in communication therewith and surrounding the axis of the venturi, said liquid passage having converging recurved walls whereby a gradual reversal in direction of flow of liquid is obtained, and terminating in a discharge lip adjacent and surrounding the upper lip of the intake passage member and generally alined with the lower face of the venturi, the length of the intake passage member being substantially less than the length of the venturi, and means for directing an excavating jet downwardly about said intake passage member.

WILLIAM H. SCHACHT.